United States Patent
Molnar et al.

(10) Patent No.: US 7,599,702 B2
(45) Date of Patent: Oct. 6, 2009

(54) SIR ESTIMATES FOR NON-SCHEDULED MOBILE TERMINALS

(75) Inventors: Karl James Molnar, Cary, NC (US); Stephen James Grant, Cary, NC (US); Leonid Krasny, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1070 days.

(21) Appl. No.: 10/745,051

(22) Filed: Dec. 23, 2003

(65) Prior Publication Data

US 2005/0136840 A1 Jun. 23, 2005

(51) Int. Cl.
*H04W 40/00* (2006.01)

(52) U.S. Cl. ........................... 455/517; 455/445

(58) Field of Classification Search .................. 455/517, 455/445, 63.1, 67.11
See application file for complete search history.

(56) References Cited

U.S. PATENT DOCUMENTS

| | | | | |
|---|---|---|---|---|
| 5,909,384 | A * | 6/1999 | Tal et al. ...................... | 708/322 |
| 6,335,954 | B1 | 1/2002 | Bottomley et al. | |
| 6,694,147 | B1 * | 2/2004 | Viswanath et al. .......... | 455/517 |
| 6,744,754 | B1 * | 6/2004 | Lee .............................. | 370/342 |
| 7,016,330 | B2 * | 3/2006 | Pietraski et al. ............. | 370/333 |
| 7,047,016 | B2 * | 5/2006 | Walton et al. ............ | 455/452.1 |
| 7,050,760 | B2 * | 5/2006 | Itoh .......................... | 455/67.13 |
| 2002/0186677 | A1 * | 12/2002 | Leung ......................... | 370/342 |
| 2003/0053524 | A1 * | 3/2003 | Dent ........................... | 375/148 |
| 2004/0120300 | A1 * | 6/2004 | Saquib ........................ | 370/342 |
| 2004/0137860 | A1 * | 7/2004 | Oh et al. .................. | 455/127.1 |
| 2004/0202242 | A1 * | 10/2004 | Lin et al. ..................... | 375/227 |
| 2005/0195924 | A1 * | 9/2005 | Chen et al. .................. | 375/343 |
| 2008/0080631 | A1 * | 4/2008 | Forenza et al. .............. | 375/260 |

FOREIGN PATENT DOCUMENTS

| | | |
|---|---|---|
| EP | 1154665 A2 | 11/2001 |
| WO | WO 02/23742 | 3/2002 |
| WO | WO 02/23743 A2 | 3/2002 |

OTHER PUBLICATIONS

Elliott et al., "Scheduling Algorithms for the cdma2000 Packet Data Evolution," IEEE 56th Vehicular Technology Conference 2002, Sep. 2002, pp. 304-310, vol. 1.

(Continued)

*Primary Examiner*—Yuwen Pan
(74) *Attorney, Agent, or Firm*—Coats & Bennett, P.L.L.C.

(57) ABSTRACT

A base station schedules one of a plurality of mobile terminals based on an expected SIR of an effective traffic channel associated with a non-scheduled mobile terminal. The expected SIR is generated by computing the expected SIR of a hypothesized traffic channel with a pre-filter adapted to the non-scheduled mobile terminal that would result if the non-scheduled mobile terminal was scheduled. A base station then schedules transmissions to the plurality of mobile terminals based on the computed expected SIR. The expected SIR may be computed so as to compensate for mismatch between the hypothesized traffic channel and a pilot channel associated with the non-scheduled mobile terminal. Alternatively, the expected SIR may be directly computed based on an estimate of the pre-filter of the hypothesized traffic channel.

99 Claims, 8 Drawing Sheets

OTHER PUBLICATIONS

Zhao et al., "A Channel-Based Mobile-Assisted Fairly-Shared Packet Scheduling Scheme for Non Real-Time Applications in CDMA Networks," IEEE Canadian Conference on Electrical and Computer Engineering (CCECE) 2003, May 2003, pp. 1577-1580, vol. 3.

K. Zangi and L. Krasny, "Capacity-Achieving Transmitter and Receiver Pairs for Dispersive MISO Channels," *IEEE Transactions on Wireless Communications*, vol. 2, No. 6, Nov. 2003, pp. 1204-1216.

K. Zangi and L. Kransy, "Maximizing Data Rate over M-Input/1-Output Channels," In *Proc. 55th IEEE Veh. Tech. Conf. Spring*, pp. 938-942, May 2002.

* cited by examiner

CORRECTION FACTOR CURVES FOR A GIVEN DELAY SPREAD, $\theta_d$

US 7,599,702 B2

SIR ESTIMATES FOR NON-SCHEDULED MOBILE TERMINALS

BACKGROUND OF THE INVENTION

The present invention relates generally to scheduling mobile terminals on a shared high-speed multi-path propagation channel in a wireless communication system and more particularly to a method for computing signal-to-interference (SIR) estimates for use in making scheduling decisions.

In conventional CDMA systems, a base station (BS) transmits signals to a plurality of mobile terminals simultaneously on a multi-path propagation traffic channel. In the high-speed downlink shared channel (HS-DSCH) mode of wideband code division multiple access (W-CDMA) multi-path propagation, packet transmissions are time-multiplexed and transmitted at the full power available to the BS, but with data rates and slot lengths that vary depending on channel conditions. Thus, the BS transmits to only one mobile terminal at a time.

For the HS-DSCH mode, a scheduler at the BS schedules the multi-path propagation transmission to mobile terminals. The scheduler determines which mobile terminal to serve at any given time. Further, the scheduler determines the data rate for the multi-path propagation transmission and the length of the multi-path propagation transmission. There are many different approaches to scheduling for the HS-DSCH mode, each of which serves different objectives. Perhaps the simplest is round-robin scheduling where each mobile terminal is scheduled in turn to receive multi-path propagation transmission. Other scheduling approaches include maximum C/I (carrier to interference) scheduling or proportionally fair scheduling. The maximum C/I scheduling approach schedules the mobile terminal with the maximum C/I ratio to maximize data throughput. The proportionally fair scheduling approach attempts to be more evenhanded by maintaining the effective data transmission rate for all mobile terminals in the same proportion to the scheduled mobile terminal's maximum achieved rate.

Most scheduling approaches require knowledge of the SIR (signal-to-interference ratio) or SINR (signal to interference plus noise ratio) corresponding to the traffic channel of each mobile terminal being scheduled. The BS obtains SIR estimates from the mobile terminals being scheduled, or calculates the SIR from signal strength measurements made by the mobile terminals and transmitted to the BS. The mobile terminal that is currently scheduled, referred to herein as the scheduled mobile terminal, despreads the traffic channel, despreads the pilot channel, estimates the channel from the pilot channel, computes the traffic channel SIR using the channel estimates and the despread traffic channel, and sends the estimated traffic channel SIR and/or some other SIR-based information, i.e., a channel quality indicator (CQI) to the BS. The mobile terminals that are not currently scheduled, referred to herein as the non-scheduled mobile terminals, measure the received signal strength on the forward pilot channel, estimate the SIR from the pilot strength measurements, and send the estimated pilot SIRs to the BS. Because the transmit powers on the HS-DSCH are typically much larger than the pilot transmit power, the pilot SIR is scaled to obtain an estimate of the traffic channel SIR. Scaling the pilot SIR to estimate the traffic channel SIR produces reasonably accurate estimates when the pilot and traffic signals travel through the same effective channel.

SUMMARY OF THE INVENTION

The present invention comprises a method and apparatus for scheduling one of a plurality of mobile terminals, including currently scheduled and non-scheduled mobile terminals, in a wireless communication system based on an expected SIR of an effective traffic channel associated with a non-scheduled mobile terminal. According to the present invention, either the base station or the non-scheduled mobile terminal estimates the expected SIR of an effective traffic channel for each non-scheduled mobile terminal by computing the expected SIR of a hypothesized traffic channel with a pre-filter adapted to the non-scheduled mobile terminal that would result if the non-scheduled mobile terminal was scheduled. A base station then schedules one of the plurality of mobile terminals in the wireless system based on the expected SIR from the non-scheduled mobile terminals and the scheduled mobile terminal.

In an exemplary embodiment, either the base station or the mobile terminal computes the expected SIR of the hypothesized traffic channel so as to compensate for mismatch between the hypothesized traffic channel and a pilot channel associated with the non-scheduled mobile terminal. The mismatch in this embodiment is at least partially attributed to the pre-filter associated with the effective traffic channel of the non-scheduled mobile terminal.

In an alternate embodiment, the base station or the mobile terminal computes the expected SIR of the hypothesized traffic channel by estimating the pre-filter of the hypothesized traffic channel that would result if the non-scheduled mobile terminal was scheduled, and computing the expected SIR based on the estimated pre-filter.

DETAILED DESCRIPTION OF THE INVENTION

Figure 1:
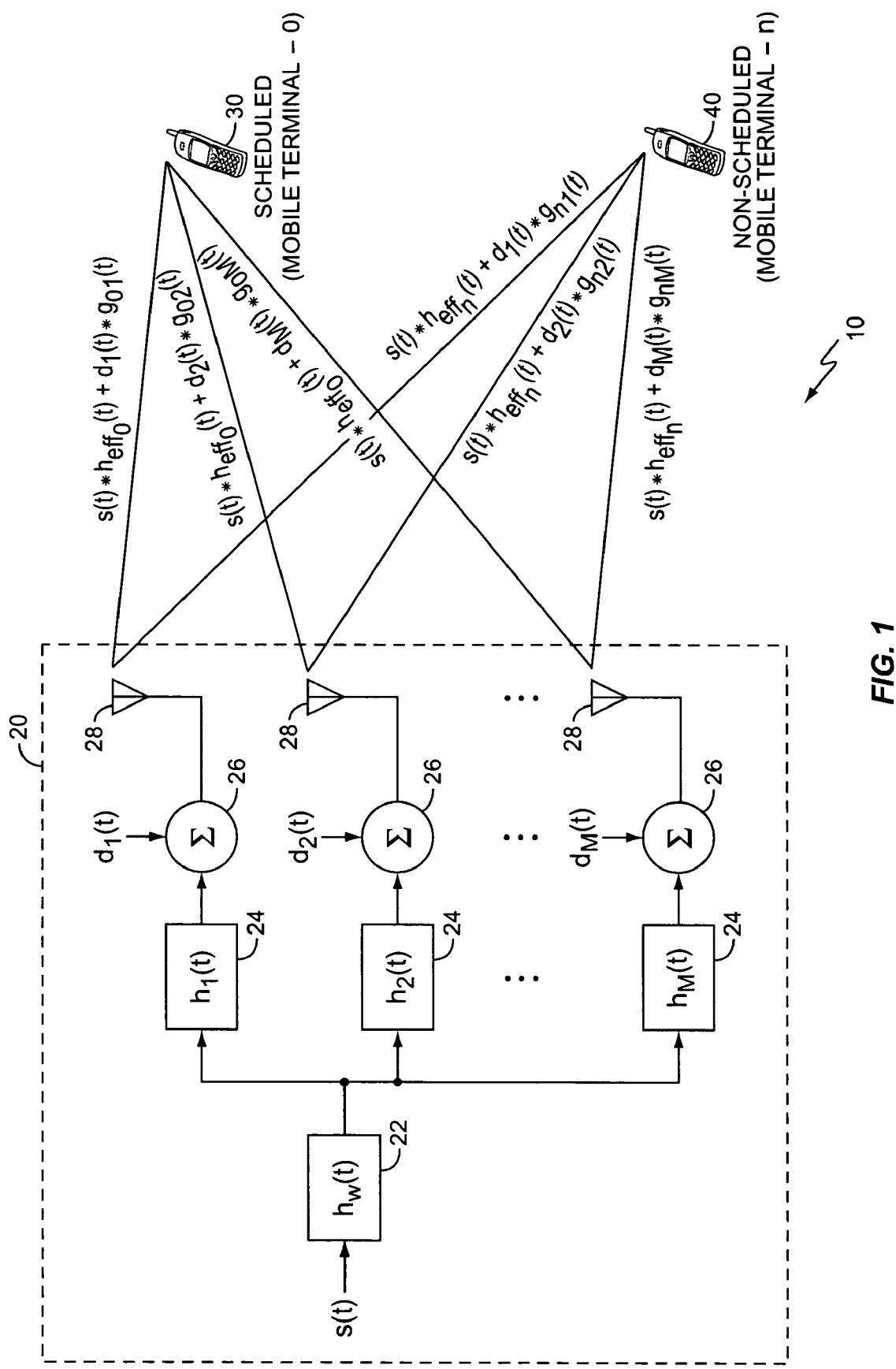
FIG. 1 illustrates a schematic of a W-CDMA wireless communication system.

FIG. 1 illustrates a wireless transmission system 10 comprising a transmitter 20, a scheduled mobile terminal 30, and a non-scheduled mobile terminal 40. For simplicity, only one non-scheduled mobile terminal 40 is shown. However, those skilled in the art will appreciate that wireless system 10 may include a plurality of non-scheduled mobile terminals 40.

Transmitter 20 employs transmit diversity to transmit a signal s(t) intended for scheduled mobile terminal 30. In the illustrated embodiment, transmitter 20 is configured for the HS-DSCH mode of a W-CDMA system, where a high-speed multi-path propagation channel is shared by time-multiplexing a plurality of mobile terminals 30, 40, as described above. Transmitter 20 also transmits signals, such as pilot channel, associated dedicated physical channel (ADPCH), and overhead channel signals, represented herein by $\{d_1(t), d_2(t), \ldots d_M(t)\}$, to the scheduled mobile terminal 30 and the non-scheduled mobile terminal 40.

The transmitter 20 includes common filter 22, M channel filters 24, M summers 26, and M antennas 28. Common filter 22 pre-filters s(t) such that the total energy transmitted from all antennas 28 is constant. Each channel filter 24 is matched to the $m^{th}$ multi-path propagation channel between the $m^{th}$ transmit antenna 28 and the receive antenna of the scheduled mobile terminal 30. As such, each channel filter 24 pre-filters s(t) to compensate for the effects of the multi-path propagation channel between the $m^{th}$ antenna 28 and the scheduled mobile terminal 30. Summer 26 combines signal d(t) with the pre-filtered signal s(t). The combined signal is transmitted to mobile terminals 30, 40 via antennas 28.

The total transmit energy emitted by transmitter 20 is divided between s(t) and signals $d_1(t), d_2(t), \ldots d_M(t)$ according to predetermined power ratios. For example, a traffic power ratio, represented by $\alpha_s$, may represent the fraction of the total transmitted energy allocated to s(t). The remaining energy represents the transmitted energy allocated to signals $\{d_1(t), d_2(t), \ldots d_M(t)\}$. As such, a power ratio, represented by $\alpha_d=1-\alpha_s$, represents the fraction of the total transmitted energy allocated to signals $\{d_1(t), d_2(t), \ldots d_M(t)\}$. Exemplary power ratios to total transmit energy may be $\alpha_s=0.7$ and $\alpha_d=0.3$.

Further, a pilot power ratio, represented by $\alpha_p$, may be defined as the fraction of the total energy allocated to the pilot signal on the $m^{th}$ antenna 28. An exemplary pilot power ratio to total transmit energy may be $\alpha_p=0.1/M$, which assumes that 10% of the total transmit energy is allocated to the pilot channel signals, where the pilot transmit energy is divided evenly between the M transmit antennas 28. In conventional wireless communication systems, the traffic power ratio divided by the pilot power ratio, referred to herein as the traffic-to-pilot ratio, is used to estimate the SIR of the HS-DSCH when the mobile terminal is not currently scheduled. The traffic channel SIR of a non-scheduled mobile terminal is determined by scaling the measured pilot SIR based on the traffic-to-pilot ratio, $\alpha_s/\alpha_p$.

As seen in FIG. 1, common filter 22 and channel filters 24 pre-filter the traffic channel signals before combining the traffic channel signals with $\{d_1(t), d_2(t), \ldots d_M(t)\}$. Due to the pre-filtering of the traffic channel, signal s(t) passes through a different effective channel than the pilot signal $p_M(t)$, one of the components of $d_M(t)$. As a result, a mismatch occurs between the measured pilot channel SIR and the traffic channel SIR, over and above that due to the traffic-to-pilot power ratio. This mismatch is addressed by the present invention.

The effective channels are determined as follows. The signal received at the scheduled mobile terminal 30 from the $m^{th}$ transmit antenna may be represented by $s(t)*h_{eff,0}(t)+d_m(t)*g_{0m}(t)$, and the signal received at the non-scheduled mobile terminal 40 may be represented by $s(t)*h_{eff,n}(t)+d_m(t)*g_{nm}(t)$. The effective traffic channel associated with the scheduled mobile terminal 30, $h_{eff,0}(t)$, and with a non-scheduled mobile terminal 40, $h_{eff,n}(t)$, is given by Equations 1a and 1b, respectively, $$h_{eff,0}(t) = h_w(t) * \sum_{m=1}^{M} h_m(t) * g_{0m}(t) \qquad \text{(Eq. 1a)}$$

$$h_{eff,n}(t) = h_w(t) * \sum_{m=1}^{M} h_m(t) * g_{nm}(t) \qquad \text{(Eq. 1b)}$$

where $h_w(t)$ represents the filter function associated with common filter 22, $h_m(t)$ represents the filter function associated with the $m^{th}$ channel filter 24, $g_{0m}(t)$ represents the $m^{th}$ multi-path propagation channel between transmitter 20 and the scheduled mobile terminal 30, and $g_{nm}(t)$ represents the $m^{th}$ multi-path propagation channel between transmitter 20 and a non-scheduled mobile terminal 40. Because $h_m(t)$ compensates for the $m^{th}$ multi-path propagation channel between transmitter 20 and the scheduled mobile terminal 30, $h_m(t)=g^*_{0m}(-t)$. Converting Equation 1a to the frequency domain provides the frequency response of the effective traffic channel for the scheduled mobile terminal 30, which is given by:

$$H_{eff,0}(\omega) = \sqrt{\sum_{m=1}^{M} |G_{0m}(\omega)|^2} \qquad \text{(Eq. 2)}$$

Contrastingly, the frequency response of the effective traffic channel for the non-scheduled mobile terminal 40 is given by:

$$H_{eff,n}(\omega) = \frac{1}{\sqrt{\sum_{m=1}^{M} |G_{0m}(\omega)|^2}} \sum_{m=1}^{M} G^*_{0m}(\omega) G_{nm}(\omega) \qquad \text{(Eq. 3)}$$

Note that the fixed filter $H_w(\omega)$ is implicitly included in Equations 2 and 3. In this case, $$H_w(\omega) = \left( \sqrt{\sum_{m=1}^{M} |G_{0m}(\omega)|^2} \right)^{-1}$$

As shown by Equations 2 and 3, the effective channel for the scheduled mobile terminal 30 depends only on the effective multi-path propagation channel for the scheduled mobile terminal 30, while the effective channel for the non-scheduled mobile terminal 40 depends on the multi-path propagation channel for both the scheduled and non-scheduled mobile terminals 30, 40. In contrast, the pilot signal received by the scheduled mobile terminal 30 from the $m^{th}$ transmit antenna traverses the channel $g_{0m}(t)$. As a result, a mismatch occurs between the SIR measured on the pilot channel and the SIR on the traffic channel. While conventional SIR estimation methods based on scaling the SIR of the pilot channel will compensate for the power mismatch, these methods do not address the additional mismatch caused by pre-filters 22, 24.

To make scheduling decisions, the base station would like to know the expected SIR of the non-scheduled mobile terminal 40 as if it was scheduled. By analogy to Equation 2, the frequency response of the effective traffic channel of the non-scheduled mobile terminal 40 as if it was scheduled is given by:

$$H_{eff,n}^{sched}(\omega) = \sqrt{\sum_{m=1}^{M} |G_{nm}(\omega)|^2}. \quad \text{(Eq. 4)}$$

As shown in Equation 4, this differs from the effective channel of the non-scheduled mobile terminal 40. The difference further adds to the mismatch between the measured pilot SIR and the traffic channel SIR. As a result of this channel mismatch, the SIR measured at a non-scheduled mobile terminal 40 differs from the SIR that would be measured at the non-scheduled mobile terminal 40 if the non-scheduled mobile terminal 40 was scheduled.

To better appreciate how the measured pilot channel SIR differs from the traffic channel SIR that would be experienced if the non-scheduled mobile terminal 40 was scheduled, consider the following mathematical model. Assume that $SIR_{true,n}$ represents the "true" SIR for a non-scheduled mobile terminal 40 as if the non-scheduled mobile terminal 40 was scheduled, and $SIR_{meas,n}$ represents the measured SIR on the pilot channels for the non-scheduled mobile terminal 40. Further, for simplicity, assume that only one code is used on the HS-DSCH. (Note that for the case of multi-code, the true SIR simply scales with the number of codes used on the HS-DSCH). The average received energy per symbol due to the single code is given by $\alpha_s E_T$, where $E_T$ represents the total received signal energy. The remainder of the received energy is due to the pilots, ADPCHs, and overhead channels, and is given by $\alpha_d E_T$.

Assuming that mobile terminals 30, 40 use a G-RAKE receiver, let Q represent the total number of fingers used in the G-RAKE receiver, and let q index the fingers. As shown in Equation 4, the effective channel for the non-scheduled mobile terminal 40 as if the non-scheduled mobile terminal 40 was scheduled is denoted $$h_{eff,n}^{sched}(t)$$

and is given by the inverse Fourier transform of $$H_{eff,n}^{sched}(\omega),$$

which depends only on the multi-path propagation channels $\{g_{nm}(t)\}_{m=1}^{M}$ for the non-scheduled mobile terminal 40. Let P represent the number of taps of the $m^{th}$ multi-path propagation channel $g_{nm}(t)$ for the non-scheduled mobile terminal 40, and let p index each of these taps. The tap gains and delays are denoted $g_{nmp}$ and $\tau_{nmp}$, respectively. Further, let L be the total number of taps of the effective channel $$h_{eff,n}^{sched}(t)$$

for the non-scheduled mobile terminal 40, and let l index each of the taps. The tap gains and delays of the effective channel are denoted $h_{nl}$ and $\tau_{nl}$, respectively.

The despread vector containing the despread value for each of the RAKE fingers of the G-RAKE receiver is given by:

$$y_n(i) = \sqrt{\alpha_s E_T} h_n c(i) + z_n(i), \quad \text{(Eq. 5)}$$

where $c(i)$ is the symbol of interest during the $i^{th}$ signaling interval, $h_n$ is a channel gain vector, and $z_n(i)$ is an impairment vector. The $q^{th}$ component of the channel gain vector $h_n$ is given by:

$$\{h_n\}_q = \sum_{l=1}^{L} h_{nl} x(\tau_q - \tau_{nl}), \quad \text{(Eq. 6)}$$

where $x(\tau)$ is the autocorrelation function of the chip pulse shape and $\tau_q$ is the delay of the $q_{th}$ finger of the G-RAKE receiver.

The impairment vector $z_n(i)$ includes (1) inter-symbol interference (ISI) on the HS-DSCH, (2) interference from the non-traffic channel signals associated with the M transmit antennas, and (3) noise plus other-cell interference, which is typically modeled as white noise. An impairment covariance matrix, $R_{z,n} = E[z_n(i) z_n^H(i)]$, may be determined by considering the channel definitions introduced in FIG. 1. The resulting expression is $R_{z,n} = I_o R_n$, where $$R_n = \alpha_s \left(\frac{E_T}{I_o}\right) R_s + \alpha_d \left(\frac{E_T}{I_o}\right) R_d + R_o. \quad \text{(Eq. 7)}$$

Equation 7 includes three component matrices, $R_s$, $R_d$, and $R_o$ that correspond, respectively, to the three different components of the impairment vector $z_n(i)$ discussed above. The $(q_1, q_2)$th element of $R_s$ is given by $$\{R_s\}_{q_1,q_2} = \frac{1}{(SF)^2} \sum_{j=-\infty}^{\infty} \sum_{l_1=1}^{L} \sum_{l_2=1}^{L} h_{nl_1} h_{nl_2}^* \sum_{u=1-SF}^{SF-1} (SF - |u|) \cdot \quad \text{(Eq. 8)}$$
$$x(jT + \tau_{q_1} - \tau_{nl_1} - uT_c)$$
$$x^*(jT + \tau_{q_2} - \tau_{nl_2} - uT_c)[1 - \delta(u)\delta(j)],$$

the $(q_1, q_2)^{th}$ element of $R_d$ is given by $$\{R_d\}_{q_1,q_2} = \frac{1}{(SF)^2} \frac{1}{M} \sum_{m=1}^{M} \sum_{j=-\infty}^{\infty} \sum_{p_1=1}^{P} \sum_{p_2=1}^{P} g_{nmp_1} g_{nmp_2}^* \quad \text{(Eq. 9)}$$
$$\sum_{u=1-SF}^{SF-1} (SF - |u|) \cdot x(jT + \tau_{q_1} - \tau_{nmp_1} - uT_c)$$
$$x^*(jT + \tau_{q_2} - \tau_{nmp_2} - uT_c)[1 - \delta(u)\delta(j)],$$

$$x(jT + \tau_{q1} - \tau_{nmp1} - uT_c)x^*(jT + \tau_{q2} - \tau_{nmp2} - uT_c)[1 - \delta(u)\delta(j)], \text{and}$$

the $(q_1, q_2)^{th}$ element of $R_o$ is given by $$\{R_o\}_{q1,q2} = x(\tau_{q1} - \tau_{q2}) \quad \text{(Eq. 10)}$$

where SF is the spreading factor, T is the symbol period, and $T_c = T/SF$ is the chip period. As shown in Equation 8, $R_s$ is a function of the effective channel, which includes the pre-filters 22, 24 designed for the non-scheduled mobile terminal 40 as if the non-scheduled mobile terminal 40 was scheduled. $R_d$ is a function of the multi-path propagation channels themselves, as shown in Equation 9.

The weight vector for the G-RAKE receiver is given by $w_n = R_{z,n}^{-1} h_n$. Applying the weight vector to the despread vector $y_n(i)$ gives the decision statistic $$Y_n(i) = w_n^H y_n(i) = \sqrt{\alpha_s E_T} w_n^H h_n c(i) + w_n^H z_n(i). \quad \text{(Eq. 11)}$$

From this, the true SIR of the non-scheduled mobile terminal 40 as if the non-scheduled mobile terminal 40 was scheduled, $SIR_{true,n}$ is given by:

$$SIR_{true,n} = \alpha_s \left(\frac{E_T}{I_o}\right) h_n^H R_n^{-1} h_n. \quad \text{(Eq. 12)}$$

Equation 12 emphasizes the dependence of $SIR_{true,n}$ on the input signal-to-noise ratio (SNR), $E_T/I_o$. For small input SNRs, $R_n \approx R_o$, and $SIR_{true,n}$ is directly proportional to $E_T/I_o$. Consequently, $SIR_{true,n}$ increases linearly with $E_T/I_o$. For very large input SNRs, $$R_n \approx \left(\frac{E_T}{I_o}\right)(\alpha_s R_s + \alpha_d R_d).$$

Now that $SIR_{true,n}$ has been defined, an expression for the measured SIR on the pilot channels for the non-scheduled mobile terminal 40, $SIR_{meas,n}$, is derived for comparison purposes. The measured SIR represents the sum of the measured pilot SIR for each of $m \in \{1, M\}$ pilot channels, as shown in Equation 13.

$$SIR_{meas,n} = \sum_{m=1}^{M} SIR_{meas,n}(m) \quad \text{(Eq. 13)}$$

To measure the SIR on the pilot channel transmitted from the $m^{th}$ antenna, the spreading code on the channel resulting in the length-Q despread vector is correlated in the G-RAKE receiver, which results in $$y_{nm}(i) = \sqrt{\alpha_p E_T} g_{nm} c_m(i) + z_{nm}(i), \quad \text{(Eq. 14)}$$

where $c_m(i)$ is the pilot symbol of interest transmitted from the $m^{th}$ antenna during the $i^{th}$ signaling interval, and $g_{mn}$ is a channel gain vector with $q^{th}$ component given by $$\{g_{nm}\}_q = \sum_{p=1}^{P} g_{nmp} x(\tau_q - \tau_{nmp}). \quad \text{(Eq. 15)}$$

Note that this is different from the despread vector for the HS-DSCH discussed above (see Equation 5) because the channel gain vector of Equation 14 is a function of the multi-path propagation channels $g_{nm}(t)$ rather than the effective channel $$h_{eff,n}^{sched}(t),$$

which includes the pre-filters 22, 24. This is one reason for the mismatch between $SIR_{meas,n}$ and $SIR_{true,n}$.

The impairment vector, $z_{nm}(i)$ is also different as it includes (1) interference from the HS-DSCH with pre-filters designed for the scheduled mobile terminal 30, (2) ISI on the $m^{th}$ pilot channel, (3) interference from the pilot, ADPCHs, and overhead channels associated with the other antennas, and (4) noise plus other-cell interference (typically modeled as white noise). The resulting covariance matrix is given by $\overline{R}_{z,n} = I_o \overline{R}_n$, where $$\overline{R}_n = \alpha_s \left(\frac{E_T}{I_o}\right) \overline{R}_s + \alpha_d \left(\frac{E_T}{I_o}\right) R_d + R_o. \quad \text{(Eq. 16)}$$

The first component of Equation 16 contains the interference from the HS-DSCH with pre-filters designed for the scheduled mobile terminal 30. The second and third components are identical to Equation 7.

The covariance matrix of Equation 16 appears similar to the covariance matrix of Equation 7. However, $\overline{R}_s$ of Equation 16 is a function of $H_{eff,n}(\omega)$ defined in Equation 3, whereas $R_s$ of Equation 7 is a function of $$H_{eff,n}^{sched}(\omega),$$

defined in Equation 4. This difference is another reason for the mismatch between $SIR_{meas,n}$ and $SIR_{true,n}$.

As discussed above, $H_{eff,n}(\omega)$ is a function of the multi-path propagation channels of both the scheduled and non-scheduled mobile terminals. Denoting $\overline{h}_{nl}$ and $\overline{\tau}_{nl}$ as the channel tap gains and delays of the effective channel $H_{eff,n}(\omega)$, the $(q_1, q_2)^{th}$ element of matrix $\overline{R}_s$ is given by $$\{\overline{R}_s\}_{q_1,q_2} = \frac{1}{(SF)^2} \sum_{j=-\infty}^{\infty} \sum_{l_1=1}^{L} \sum_{l_2=1}^{L} \overline{h}_{nl_1} \overline{h}_{nl_2}^* \sum_{u=1-SF}^{SF-1} (SF - |u|) \cdot \quad \text{(Eq. 17)}$$
$$x(jT + \tau_{q_1} - \overline{\tau}_{nl_1} - uT_c)$$
$$x^*(jT + \tau_{q_2} - \overline{\tau}_{nl_2} - uT_c)[1 - \delta(u)\delta(j)],$$

which has the same form as Equation 8, except the channel tap gains and delays are different.

The weight vector for the G-RAKE receiver for the $m^{th}$ pilot channel is given by $w_{nm} = \overline{R}_{z,n}^{-1} g_{nm}$. Applying the weight vector to the despread vector $y_{nm}(i)$ gives the decision statistic $$Y_{nm}(i) = w_{nm}^H y_{nm}(i) = \sqrt{\alpha_p E_T} w_{nm}^H h_{nm} c(i) + w_{nm}^H z_{nm}(i). \quad \text{(Eq. 18)}$$

From this the measured SIR of the non-scheduled mobile terminal 40 on the $m^{th}$ pilot channel is given by $$SIR_{meas,n} = \alpha_p \left(\frac{E_T}{I_o}\right) g_{nm}^H \overline{R}_n^{-1} g_{nm}. \quad \text{(Eq. 19)}$$

As discussed above and shown in Equations 12 and 19, there is a mismatch between the true SIR ($SIR_{true,n}$) and the measured SIR ($SIR_{meas,n}$). Equation 20 provides a comparison of Equation 12 and Equation 19 that better illustrates this mismatch.

$$\frac{SIR_{true,n}}{SIR_{meas,n}} = \frac{\alpha_s}{\alpha_p}(h_n^H R_n^{-1} h_n)(g_{nm}^H \overline{R}_n^{-1} g_{nm})^{-1} \quad \text{(Eq. 20)}$$

As shown by Equation 20, $SIR_{meas,n}$ differs from $SIR_{true,n}$ by more than the simple scaling factor $\alpha_s/\alpha_p$. As a result, the simple scaling factor associated with the power ratios will not reliably compensate for the mismatch caused by pre-filters 22, 24. In other words, the effective channel mismatch between the pilot channel of the non-scheduled mobile terminal 40 and the effective traffic channel that would result if the non-scheduled mobile terminal 40 was scheduled renders the simple scaling factor technique of the conventional systems insufficient for systems that pre-filter traffic channel signals.

The present invention addresses the SIR mismatch problem in the non-scheduled mobile terminals 40 by generating an expected SIR of a hypothesized effective traffic channel of the non-scheduled mobile terminal 40 that would have resulted if the non-scheduled mobile terminal 40 was scheduled. While the following discussions focus on the non-scheduled mobile terminal, it will be understood that because the scheduled mobile terminal also encounters a mismatch problem between the traffic channel and the measured pilot channel, the present invention may also be applied to the scheduled mobile terminal.

Figure 2:
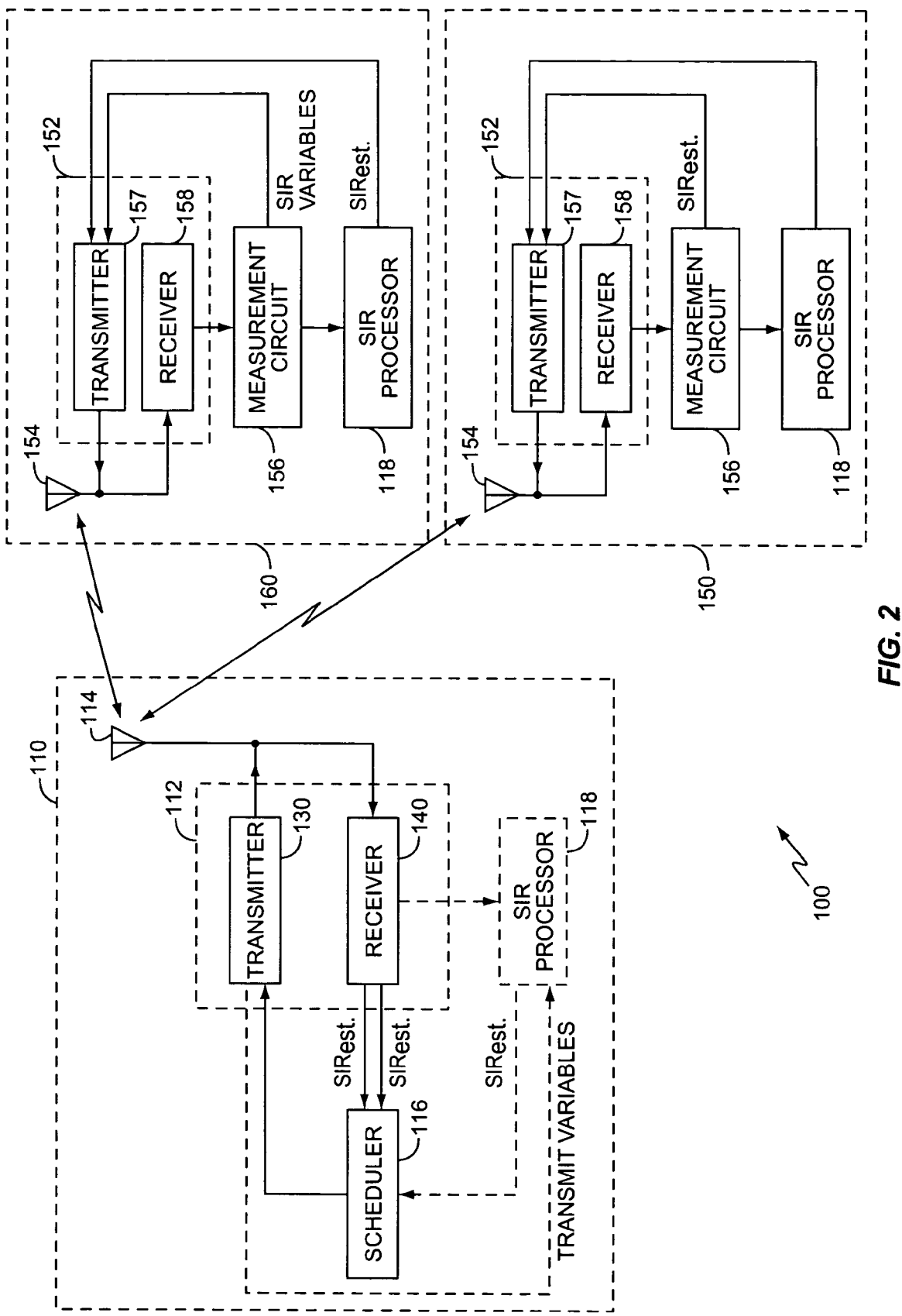
FIG. 2 illustrates an exemplary wireless communication system according to the present invention.

The present invention may be implemented in any wireless communication system, such as the exemplary wireless communication system 100 shown in FIG. 2. Wireless communication system 100 comprises a base station 110, a scheduled mobile terminal 150, and a non-scheduled mobile terminal 160. Base station 110 comprises transceiver 112, antenna 114, scheduler 116, and an optional SIR processor 118. Transceiver 112 includes a transmitter 130, i.e., the transmitter 20 shown in FIG. 1, that transmits a signal to a plurality of mobile terminals 150, 160 via antenna 114. In particular, transmitter 130 pre-filters signal s(t) and transmits a combination of d(t) and the pre-filtered signal s(t) to the scheduled mobile terminal 150 and the non-scheduled mobile terminal 160, as described above. While FIG. 2 only shows a single antenna 114 associated with transmitter 130, those skilled in the art will appreciate that, as with transmitter 20 of FIG. 1, the transmitter 130 of FIG. 2 may include multiple antennas 114.

Transceiver 112 further includes a receiver 140 that receives communication signals from mobile terminals 150, 160 via antenna 114. Receiver 140 also receives scheduling information, i.e., SIR estimates ($SIR_{est}$) from the scheduled mobile terminal 150 and the non-scheduled mobile terminal 160, a representation or mapping of the $SIR_{est}$, such as a channel quality indicator (CQI), and/or, in some cases, SIR variables from one or more non-scheduled mobile terminals 160. When SIR variables are provided to base station 110, the receiver provides the SIR variables to an SIR processor 118 in base station 110 to generate the expected SIR for the mobile terminals 150, 160, as described further below. Scheduler 116 then receives the expected SIRs from receiver 140 and/or SIR processor 118 and schedules one of the plurality of mobile terminals 150, 160 based on the provided SIRs.

Each mobile terminal 150, 160 includes a transceiver 152, an antenna 154, a measurement circuit 156, and an SIR processor 118. Each transceiver includes a transmitter 157 for transmitting signals to the base station 110 via antenna 154 and a receiver 158 for receiving signals from the base station 110 via antenna 154. According to the present invention, measurement circuit 156 in scheduled mobile terminal 150 despreads the corresponding traffic channel, estimates the traffic channel SIR, and sends the estimated SIR and/or a representation or mapping of the estimated SIR, e.g., a CQI, to base station 110 for processing at the scheduler 116. A CQI is typically a 5-bit number that corresponds to predetermined SIR values. Because the scheduled mobile terminal 150 despreads the traffic channel, it is able to estimate the gain vector $h_0$ and the impairment covariance matrix $R_0$, and thus the SIR on the traffic channel. The gain vector $h_0$ has exactly the same form as $h_n$ in Equation 6, except that $h_{nl}$ is replaced by $h_{0l}$, i.e., the tap gains of the effective traffic channel $h_{eff,0}$(t). These tap gains are calculated by estimating the tap gains of each of the channels $\{g_{0m}(t)\}_{m=1}^{M}$ using the pilots, and then using the equation given by Equation 2 to calculate the effective channel (in the frequency domain). The impairment covariance matrix $R_0$ may be calculated by performing a time average of the despread traffic channel. The despread vector is $y_0(i)$. The estimated impairment covariance matrix is therefore given by:

$$\hat{R}_{z,0} = <y_0(i)y_0^H(i)> - \sqrt{\alpha_s E_T} \hat{h}_0 \hat{h}_0^H, \quad \text{(Eq. 21)}$$

where $\hat{h}_0$ is the estimated gain vector and $<\cdot>$ signifies a time average. The SIR estimate is then given by:

$$(SIR_{true,0})_{est} = \alpha_s E_T \hat{h}_0^H \hat{R}_{z,0}^{-1} \hat{h}_0 = \alpha_s \frac{E_T}{I_o} \hat{h}_0^H \hat{R}_0^{-1} \hat{h}_0, \quad \text{(Eq. 22)}$$

where $R_0 = I_o R_{z,0}$. Therefore, while the scheduled mobile terminal 150 is scheduled, SIR processor 118 may estimate the SIR using the despread traffic channel. Alternatively, the SIR processor 118 may treat the scheduled mobile terminal 150 as a non-scheduled mobile terminal 160 and estimate the SIR for the scheduled mobile terminal according to the embodiments discussed further below.

Because the non-scheduled mobile terminal 160 does not have knowledge of the multi-path propagation channel associated with the scheduled mobile terminal 150, the SIR measured by measurement circuit 156 in the non-scheduled mobile terminal 160 does not correspond to the expected SIR of a future traffic channel transmission. Therefore, in order to generate the expected SIR of a non-scheduled mobile terminal 160, the SIR processor 118 computes the expected SIR based on a hypothesized traffic channel that would have resulted if the non-scheduled mobile terminal 160 was scheduled, as described further below. The computed SIR is then provided to scheduler 116.

According to the present invention, the SIR processor 118 in non-scheduled mobile terminal 160 may compute the expected SIR and then transmit the computed SIR to the base station 110 for further processing in scheduler 116. Alternatively, the non-scheduled mobile terminal 160 may transmit the SIR variables generated by measurement circuit 156 to the base station 110 for further processing in the base station SIR processor 118. The base station SIR processor 118 then computes the expected SIR and forwards the computed SIR to the scheduler 116 for further processing, as discussed above.

In a first exemplary embodiment of the present invention, the SIR processor 118 in either the non-scheduled mobile terminal 160 or in base station 110 computes an expected SIR of a hypothesized traffic channel associated with the non-scheduled mobile terminal 160 that would have resulted if the non-scheduled mobile terminal 160 was scheduled by applying a correction factor to a measured pilot SIR associated with the non-scheduled mobile terminal 160. The correction factor compensates for the channel mismatch between the pilot channel and the effective traffic channel that would exist if the non-scheduled mobile terminal 160 was scheduled. In general, the measurement circuit 156 of the non-scheduled mobile terminal 160 measures SIR variables, i.e., pilot channel SIR ($SIR_p$), and provides the SIR variables to the SIR processor 118. Measurement circuit 156 may also measure a delay spread $\theta_d$ (another SIR variable) corresponding to the pilot channel signals. Alternatively, a nominal delay spread $\theta_d$ may be stored in memory for use by SIR processor 118. SIR processor 118 then determines the correction factor, $\phi_n$, based on the measured SIR variables, as discussed further below, and applies the correction factor $\phi_n$ and optionally a power scalar $\alpha_s/\alpha_p$ to the measured pilot $SIR_p$ to compensate for the channel and power mismatch between the pilot channel and the hypothesized traffic channel.

Figure 3:
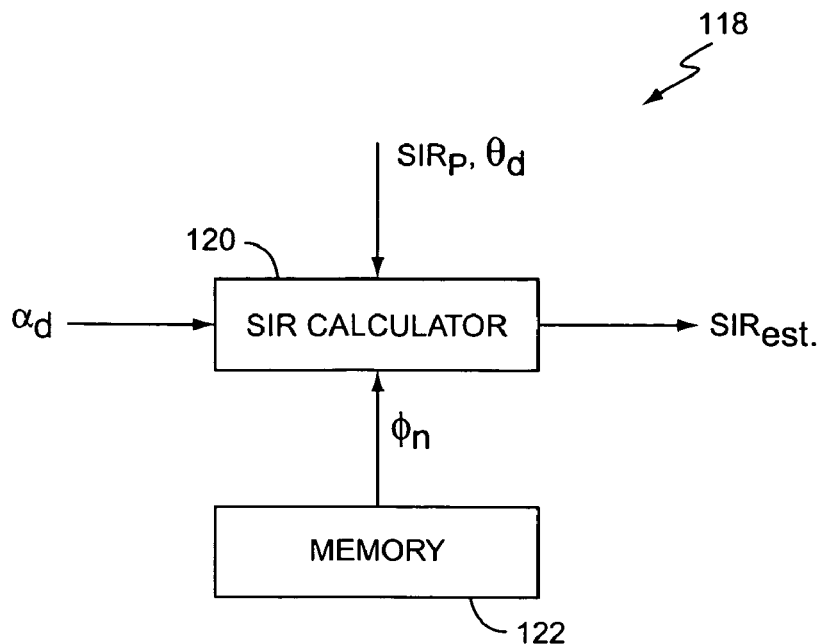
FIG. 3 illustrates an exemplary SIR processor according to an exemplary embodiment of the present invention.
Figure 4:
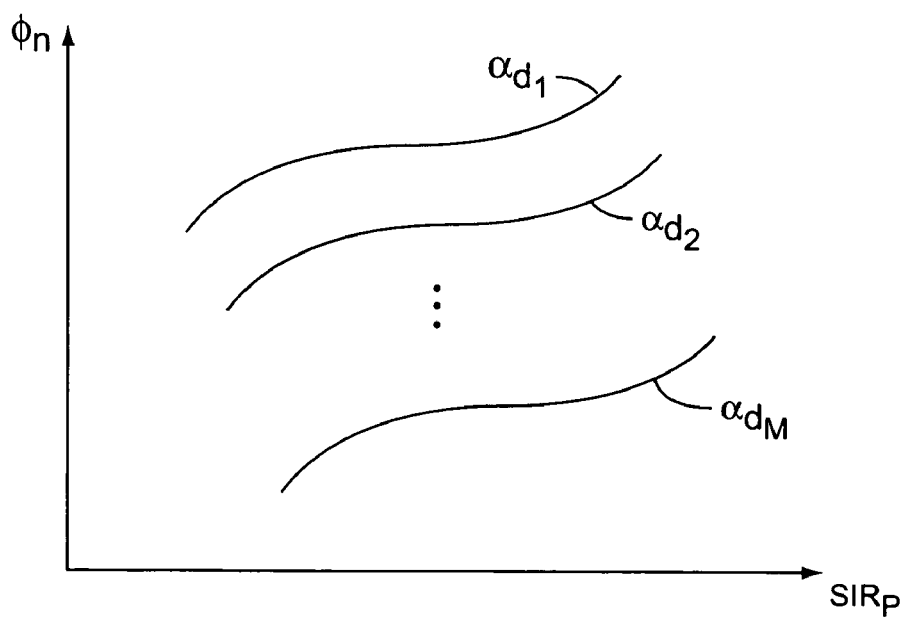
FIG. 4 illustrates a plot of correction factors vs. signal-to-interference ratios.

In an exemplary embodiment, as shown in FIG. 3, SIR processor 118 includes an SIR calculator 120 and memory 122. Memory 122 stores a plurality of pre-determined correction factors $\phi_n$ in a look-up table. Each of the stored correction factors $\phi_n$ represents an appropriate correction factor $\phi_n$ for an SIR that results with a particular receiver configuration and channel scenario. For example, it can be shown that correction factor $\phi_n$ depends on the pilot SIR ($SIR_p$), as shown in FIG. 4. As such, a different correction factor $\phi_n$ may be generated for each of a plurality of projected pilot SIRs for a given non-traffic power ratio $\alpha_d$ and stored in a look-up table of correction factors stored in memory. In this embodiment, SIR calculator 120 selects a correction factor $\phi_n$ from the stored look-up table of correction factors $\phi_n$ based on a calculated pilot SIR.

Further, different non-traffic power ratios ($\alpha_{d1}, \alpha_{d2}, \ldots \alpha_{dj}$) correspond to different sets of projected pilot SIRs and correction factors $\phi_n$. In other words, as shown in FIG. 4, there is a different set of correction factor/pilot SIR curves for each power ratio $\alpha_d$. As a result, a look-up table of correction factors based on different values of pilot SIRs and power ratios $\alpha_d$ may be stored in memory. In this embodiment, SIR calculator 120 selects a correction factor $\phi_n$ from the stored look-up table based on a known pilot SIR and a power ratio $\alpha_d$.

Further still, the set of curves illustrated in FIG. 4 may correspond to a specific delay spread $\theta_d$ corresponding to the pilot channel signals. The delay spread may be measured or preset to a nominal value. As a result, a look-up table of correction factors $\phi_n$ based on projected pilot SIRs and power ratios $\alpha_d$ may be stored in memory for each of a plurality of projected delay spreads $\theta_d$. In this embodiment, SIR calculator 120 selects a correction factor from the stored look-up table based on a known pilot SIR, a known power ratio $\alpha_d$, and a known delay spread $\theta_d$.

Figure 5:
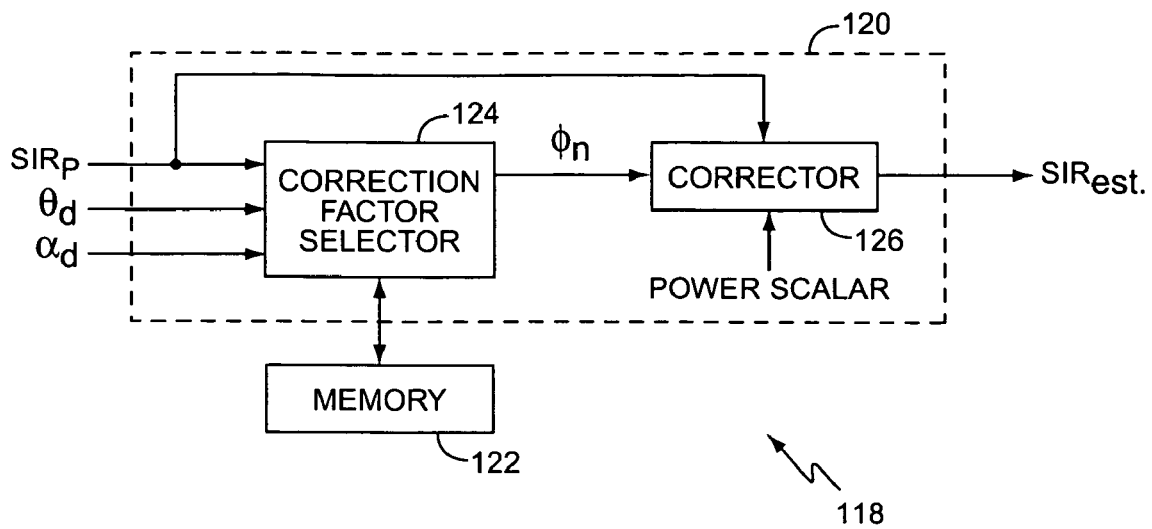
FIG. 5 illustrates further details of the exemplary SIR processor of FIG. 3.

Referring now to FIG. 5, an exemplary SIR calculator 120 includes a correction factor selector 124 and a corrector 126. As shown in FIG. 5, correction factor selector 124 receives one or more SIR variables, such as a pilot SIR and/or a delay spread $\theta_d$, from measurement circuit 156 and selects the correction factor $\phi_n$ from the look-up table stored in memory 122 based on a known power ratio $\alpha_d$, the measured pilot SIR, and/or the measured delay spread $\theta_d$; when the expected SIR is computed in the non-scheduled mobile terminal 160, the base station either sends power ratio $\alpha_d$ to the mobile terminal 160, or mobile terminal 160 uses a preset power ratio $\alpha_d$. Corrector 126 then applies the selected correction factor $\phi_n$ and optionally a power scalar, i.e., $\alpha_s/\alpha_p$, to the measured pilot SIR to determine the expected SIR for the non-scheduled mobile terminal 160. Corrector 128 may be a multiplier that applies the correction factor $\phi_n$ by multiplying the measured pilot SIR by the correction factor $\phi_n$ and the power scalar. Alternatively, if the pilot SIR, the correction factor $\phi_n$, and the power scalar $\alpha_d$ are expressed in terms of dB units, corrector 128 may be a summer that applies the correction factor $\phi_n$ by adding the correction factor $\phi_n$ and the power scalar $\alpha_s/\alpha_p$ to the measured pilot SIR. As mentioned above, the non-scheduled mobile terminal 160 may compute the expected SIR of the non-scheduled mobile terminal 160, and may provide the base station 110 with either the computed SIR or a representation of the SIR, i.e., the CQI. Alternatively, the non-scheduled mobile terminal 160 may provide the SIR variables generated by measurement circuit 156 to the base station 110 to determine the expected SIR.

Figure 6:
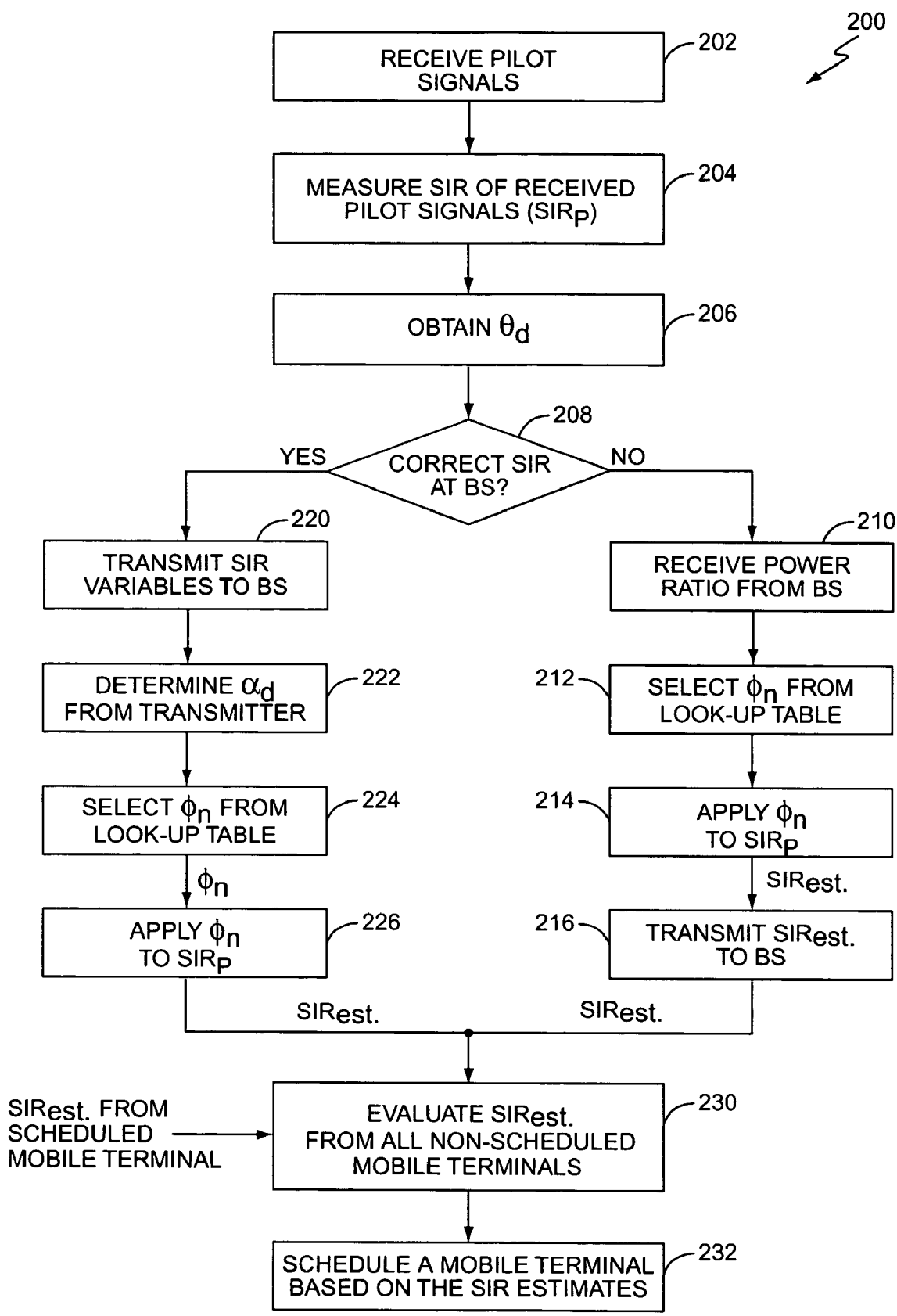
FIG. 6 illustrates a flow diagram of an exemplary method corresponding to FIGS. 2 and 3-5.

The above-described embodiment compensates for the SIR mismatch in a non-scheduled mobile terminal 160 by applying a correction factor to a measured pilot SIR of a non-scheduled mobile terminal 160. FIG. 6 provides a flow chart illustrating an exemplary procedure 200 executed in a processor or programmable circuit for a non-scheduled mobile terminal 160. After the non-scheduled mobile terminal 160 receives pilot signals transmitted from base station 110 (block 202), measurement circuit 156 measures the pilot SIR, (block 204) of the received pilot channel signal. The delay spread $\theta_d$ is then obtained (block 206). The delay spread $\theta_d$ may either be measured in measurement circuit 156 or it may be a nominal value stored in memory. SIR processor 118 then determines whether the mismatch will be corrected at base station 110 or at the non-scheduled mobile terminal 160 (block 208). If the mismatch is to be corrected at the non-scheduled mobile terminal 160, SIR calculator 120 receives a power ratio $\alpha_d$ from the base station 110 (block 210), and selects the correction factor $\phi_n$ from the look-up table stored in memory 122 based on the measured pilot SIR ($SIR_p$), delay spread $\theta_d$, and/or power ratio $\alpha_d$ (block 212). Alternatively, SIR calculator 120 may use a nominal power ratio $\alpha_d$ stored in memory and selects the correction factor $\phi_n$ from the look-up table stored in memory 122 based on the measured pilot SIR ($SIR_p$), delay spread $\theta_d$, and/or power ratio $\alpha_d$ (block 212). SIR calculator 120 then applies the correction factor $\phi_n$ to the measured pilot SIR (block 214), and transmits the resulting expected SIR to base station 110 (block 216).

If the mismatch is to be corrected at the base station 110, non-scheduled mobile terminal 160 transmits the SIR variables to the SIR processor 118 in base station 110 (block 220). Using the pilot SIR received from the non-scheduled mobile terminal 160, delay spread $\theta_d$ (either measured or nominal) and/or power ratio $\alpha_d$ (either measured or nominal) (block 222), SIR calculator 120 in base station 110 selects the correction factor $\phi_n$ from the look-up table stored in memory 122 (block 224) and applies the correction factor $\phi_n$ to the measured pilot SIR (block 226) to generate the expected SIR ($SIR_n$).

This process is repeated for each non-scheduled mobile terminal 160 in the wireless system. Further, the scheduled mobile terminal 150 provides an SIR corresponding to the scheduled mobile terminal 150 to the base station 110. Scheduler 116 then evaluates the SIRs (block 230) and schedules one of the mobile terminals 150, 160 based on the SIRs (block 232).

A second embodiment of the present invention compensates for the above described effective channel mismatch by hypothesizing the effective traffic channel of the non-scheduled mobile terminal 160 that would have resulted if the non-scheduled mobile terminal 160 was scheduled, and directly computing the expected SIR of the non-scheduled mobile terminal 160 based on the hypothesized effective traffic channel using Equation 12. As discussed above, non-scheduled mobile terminal 160 has knowledge of the effective channel and can compute the pre-filters 22, 24 that would be used if non-scheduled mobile terminal 160 was scheduled, and therefore has knowledge of the channel gain vector $h_n$ and the noise covariance matrix $R_n$. Because non-scheduled mobile terminal 160 also can assume some known value of the total received signal energy $E_T$ and has access to power ratio $\alpha_d$, the non-scheduled mobile terminal 160 has access to all of the variables necessary to compute the SIR using Equation 12 except for an estimate of the underlying noise level $I_o$. Therefore, an exemplary SIR processor 118 for the second embodiment further includes means for estimating the underlying noise level $I_o$, in addition to SIR calculator 120.

Figure 7:
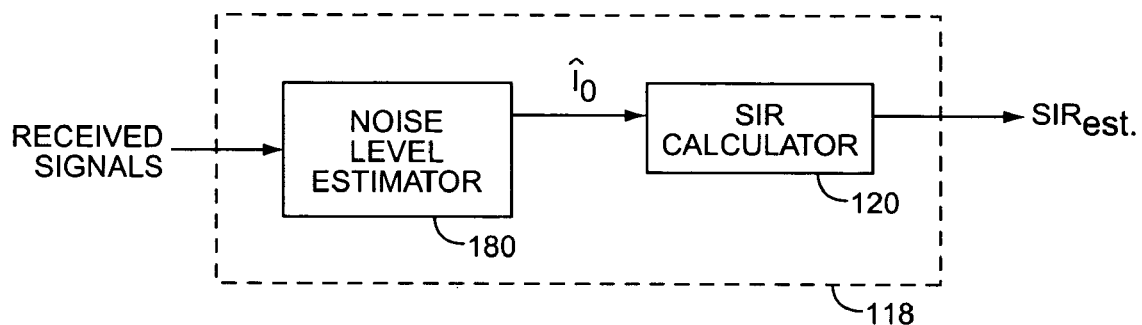
FIG. 7 illustrates another exemplary SIR processor according to an exemplary embodiment of the present invention.

As shown in FIG. 7, an exemplary block diagram of an SIR processor 118 according to the second embodiment of the present invention includes a noise level estimator 180 and SIR calculator 120. Noise estimator 180 determines an estimate of the underlying noise level, $\hat{I}_o$, and provides the noise estimate $\hat{I}_o$ to SIR calculator 120. SIR calculator 120 then uses the noise estimate $\hat{I}_o$ to compute the expected SIR for a non-scheduled mobile terminal 160 according to Equation 12. The expected SIR is then transmitted to base station 110 for further processing in scheduler 116, as described above.

Noise estimator 180 may generate the noise estimate $\hat{I}_o$, according to any known method. For example, the noise estimate $\hat{I}_o$ may be generated according to the method disclosed in commonly assigned U.S. patent application Ser. No. 09/660,050, entitled "Apparatus for and Method of Adapting a Radio Receiver Using Control Functions" and filed 12 Sep. 2000, which is incorporated herein by reference.

Figure 8:
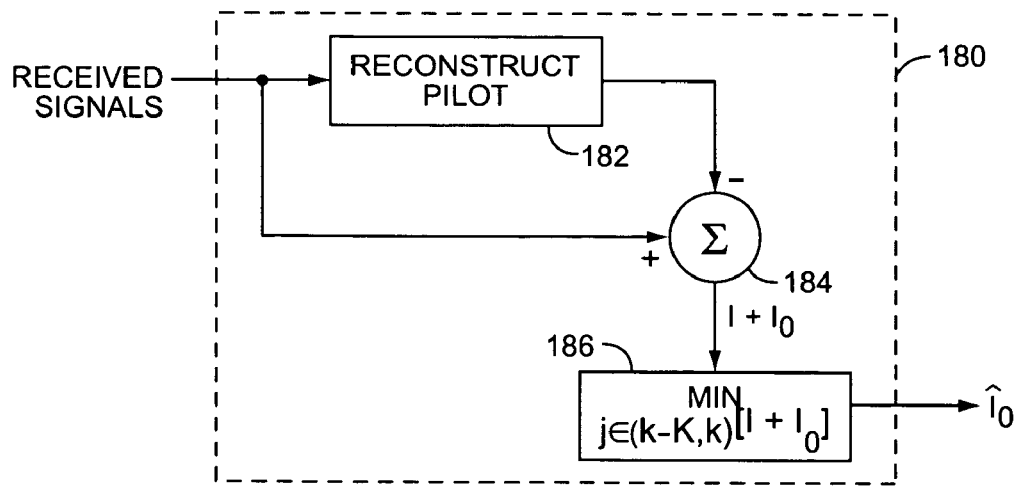
FIG. 8 illustrates an exemplary noise estimator of the present invention.

Alternatively, noise estimator 180 may generate the noise estimate $\hat{I}_o$ based on an estimate of an interference noise level, a combination of the interference I and the underlying noise $I_o$, over different frames of a received signal. In this embodiment, shown in FIG. 8, noise estimator 180 includes pilot reconstructor 182, combiner 184, and minimum processor 186. In this embodiment, pilot reconstructor 182 reconstructs the pilot signal from the received signal to generate a reconstructed pilot signal over K frames. Combiner 184 subtracts the K frames of the reconstructed pilot signal from the corresponding K frames of the received signal to generate a set of K estimates of the interference noise level. Minimum processor 186 then selects the minimum interference noise level from the set of K interference noise levels as the noise level estimate $\hat{I}_o$.

The above-described embodiment calculates the SIR based on a noise estimate $\hat{I}_o$. While practical implementations of the second embodiment may perform this calculation at the non-scheduled mobile terminal 160, those skilled in the art will appreciate that the base station 110 may also calculate the expected SIR of the non-scheduled mobile terminal 160 provided that the non-scheduled mobile terminal 160 supplies the base station 110 with the necessary SIR variables.

Figure 9:
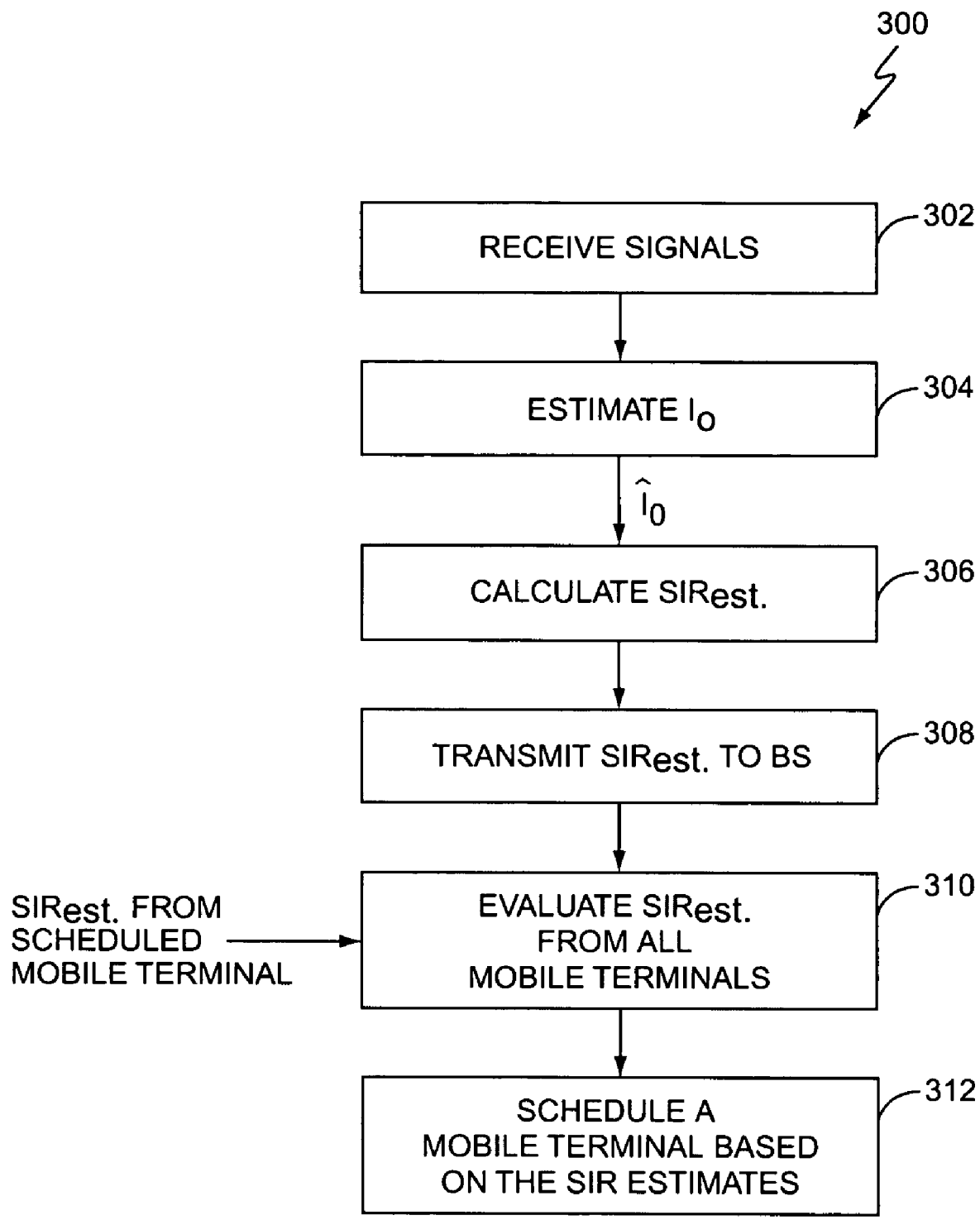
FIG. 9 illustrates a flow diagram of an exemplary method corresponding to FIGS. 2 and 7-8.

The second exemplary embodiment of the present invention compensates for the SIR mismatch by directly computing an expected SIR for the non-scheduled mobile terminal 160, based on a noise estimate $\hat{I}_o$ as if the non-scheduled mobile terminal 160 was scheduled. FIG. 9 provides an exemplary method 300 for scheduling mobile terminals 150, 160 using the expected SIRs directly computed from the underlying noise estimates, as described above. According to the exemplary method 300, the non-scheduled mobile terminal 160 receives the signals from base station 110 (block 302). From these received signals, noise estimator 180 generates an estimate of the underlying noise level, $\hat{I}_o$, according to any method described above (block 304). SIR calculator 120 then directly computes the expected SIR for a non-scheduled mobile terminal 160 based on the noise estimate $\hat{I}_o$ (block 306). After each mobile terminal transmits their expected SIR to base station 110 (block 308), the scheduler 116 evaluates each of the expected SIRs (block 310) and schedules one of the mobile terminals based on the expected SIRa (block 312).

Figure 10:
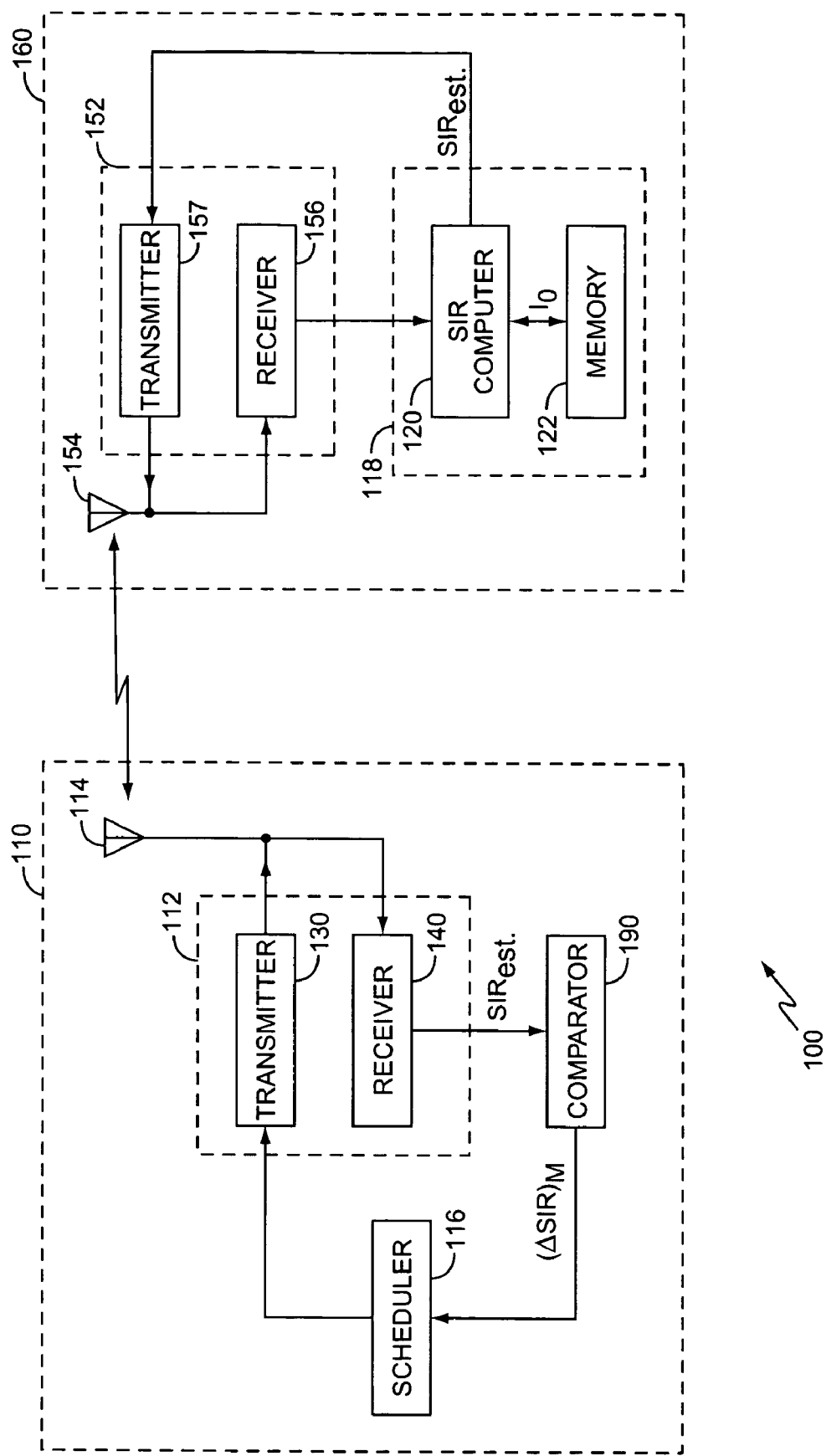
FIG. 10 illustrates another exemplary embodiment of the wireless communication system of FIG. 2.

Instead of estimating $I_o$, the SIR processor 118 in each non-scheduled mobile terminal 160 may directly compute an expected SIR according to Equation 12 using a preset noise level predetermined by the base station 110 and stored in memory 122, as shown in FIG. 10. In this embodiment, the SIR processor 118 in base station 110 is replaced by a comparator 190 that compares the expected SIRs provided by the scheduled and non-scheduled mobile terminals 150, 160. Based on this comparison, comparator 190 generates a set of relative SIR estimates $\Delta SIR_{est}$. Scheduler 116 then evaluates the set of relative SIR estimates according to predetermined criteria to determine which mobile terminal should be scheduled.

Figure 11:
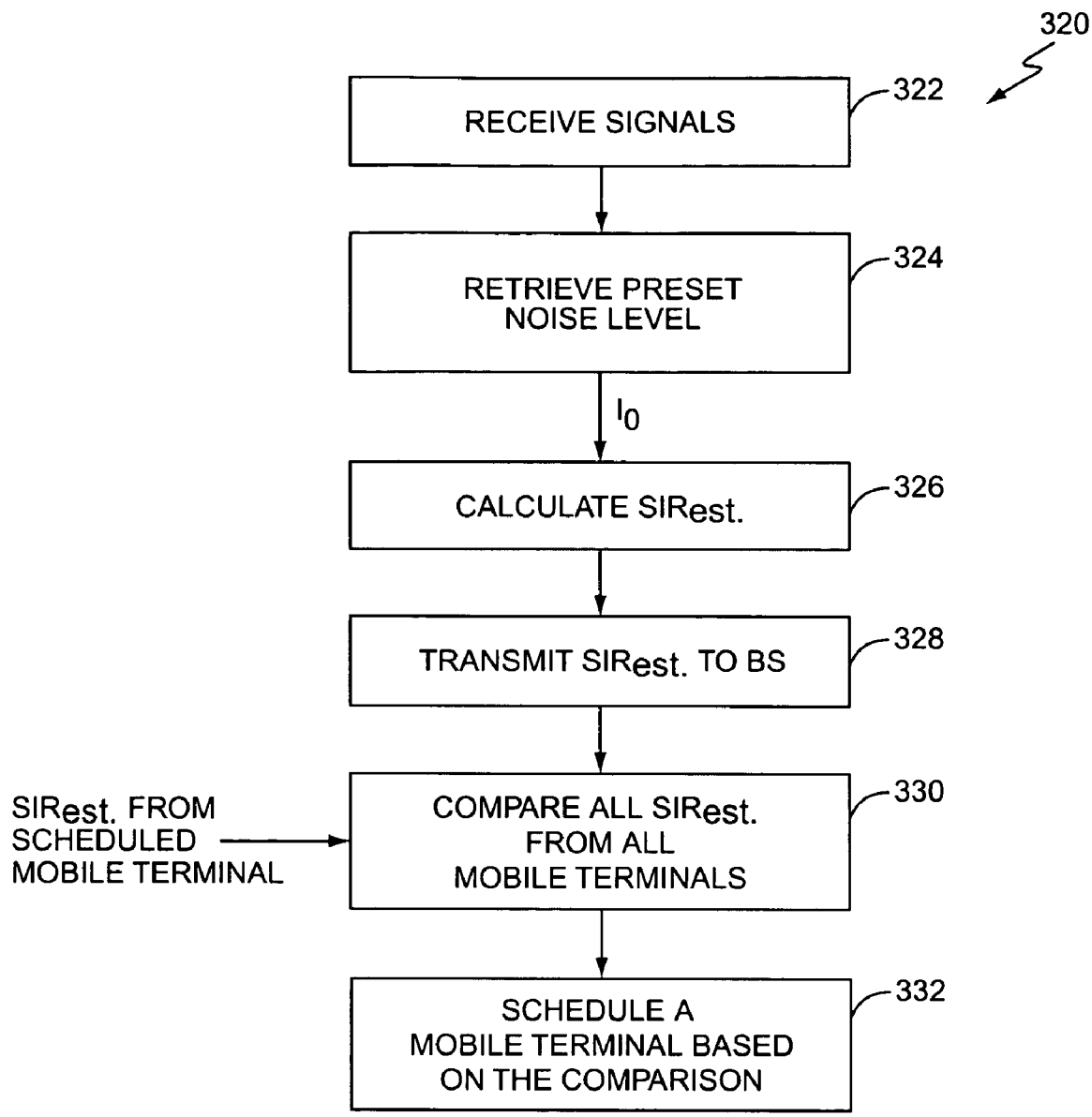
FIG. 11 illustrates a flow diagram of an exemplary method corresponding to FIGS. 2 and 10.

FIG. 11 illustrates an exemplary method 320 for scheduling mobile terminals using the set of relative SIR estimates described above. According to the exemplary method 320, non-scheduled mobile terminal 160 receives the signals from base station 110 (block 322). After retrieving the preset noise level from memory (block 324), SIR calculator 120 computes the expected SIR using the preset noise level $\hat{I}_o$ (block 326). After each mobile terminal transmits their expected SIR to base station 110 (block 328), comparator 190 compares each of the expected SIRs from the scheduled and non-scheduled mobile terminals 150, 160 (block 330) to generate the set of relative SIR estimates, $\Delta SIR_{est}$. Based on the set of relative SIR estimates, scheduler 116 schedules one of the mobile terminals (block 332).

The above-described invention provides an improved method and apparatus for estimating an expected SIR for a non-scheduled mobile terminal 160, and therefore, provides an improved method and apparatus for scheduling mobile terminals 150, 160 in a wireless communication system 100. While the previous discussions focused on wireless systems that use the HS-DSCH mode of a W-CDMA system, those skilled in the art will appreciate that the above described method and apparatus is applicable to any wireless communication system that pre-filters traffic channel signals separately from pilot channel signals. As such, the above-described problem is present in any wireless communication system where the effective traffic channel differs from the effective pilot channel due to the pre-filters associated with the traffic channel signals.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of estimating an expected signal-to-interference ratio (SIR) of an effective traffic channel for a non-scheduled mobile terminal comprising:
    computing the expected SIR of a hypothesized traffic channel with a pre-filter adapted to the non-scheduled mobile terminal that would result if the non-scheduled mobile terminal was scheduled.

2. The method of claim 1 wherein computing the expected SIR of the hypothesized traffic channel with the pre-filter adapted to the non-scheduled mobile terminal that would result if the non-scheduled mobile terminal was scheduled comprises:
    computing the expected SIR of the hypothesized traffic channel so as to compensate for mismatch between the hypothesized traffic channel and a pilot channel associated with the non-scheduled mobile terminal,
    wherein said mismatch is due to the pre-filter that would result if the non-scheduled mobile terminal was scheduled.

3. The method of claim 2 wherein computing the expected SIR of the hypothesized traffic channel so as to compensate for the mismatch between the hypothesized traffic channel and the pilot channel associated with the non-scheduled mobile terminal comprises:
  measuring a pilot SIR of the pilot channel associated with the non-scheduled mobile terminal; and
  applying a correction factor to the measured pilot SIR to compensate for the mismatch between the hypothesized traffic channel and the pilot channel associated with the non-scheduled mobile terminal.

4. The method of claim 3 wherein applying the correction factor to the measured pilot SIR comprises multiplying the pilot SIR by the correction factor.

5. The method of claim 3 wherein applying the correction factor to the measured pilot SIR comprises adding the correction factor to the pilot SIR.

6. The method of claim 3 further comprising determining separate correction factors for different values of pilot SIR.

7. The method of claim 6 further comprising:
  storing the correction factors for different values of pilot SIR in a look-up table; and
  selecting the correction factor corresponding to the measured pilot SIR from the look-up table.

8. The method of claim 3 further comprising determining separate correction factors for different values of signal delay spread.

9. The method of claim 8 further comprising:
  storing the correction factors for different values of signal delay spread in a look-up table; and
  selecting the correction factor corresponding to a current signal delay spread from the look-up table.

10. The method of claim 9 wherein selecting the correction factor corresponding to the current signal delay spread from the look-up table comprises selecting the correction factor corresponding to a nominal signal delay spread stored in memory from the look-up table.

11. The method of claim 9 wherein selecting the correction factor corresponding to the current signal delay spread from the look-up table comprises selecting the correction factor corresponding to a measured signal delay spread from the look-up table.

12. The method of claim 3 further comprising determining separate correction factors for different values of transmit power ratios.

13. The method of claim 12 further comprising:
  storing the correction factors for different values of transmit power ratio in a look-up table; and
  selecting the correction factor corresponding to a current transmit power ratio from the look-up table.

14. The method of claim 13 wherein selecting the correction factor corresponding to the current transmit power ratio from the look-up table comprises selecting the correction factor corresponding to a nominal transmit power ratio stored in memory from the look-up table.

15. The method of claim 13 wherein selecting the correction factor corresponding to the current transmit power ratio from the look-up table comprises selecting the correction factor corresponding to a known transmit power ratio from the look-up table.

16. The method of claim 3 further comprising determining separate correction factors for different combinations of pilot SIR and transmit power ratio.

17. The method of claim 16 further comprising:
  storing the correction factors for different combinations of pilot SIR and transmit power ratio in a look-up table; and
  selecting the correction factor corresponding to the measured pilot SIR and a current transmit power ratio from the look-up table.

18. The method of claim 3 further comprising determining separate correction factors for different combinations of pilot SIR and signal delay spread.

19. The method of claim 18 further comprising:
  storing the correction factors for different combinations of pilot SIR and signal delay spread in a look-up table; and
  selecting the correction factor corresponding to the measured pilot SIR and a current signal delay spread from the look-up table.

20. The method of claim 3 further comprising determining separate correction factors for different combinations of pilot SIR, transmit power ratio, and signal delay spread.

21. The method of claim 20 further comprising:
  storing the correction factors for different combinations of pilot SIR, transmit power ratio, and signal delay spread in a look-up table; and
  selecting the correction factor corresponding to the measured pilot SIR, a current transmit power ratio, and a current signal delay spread from the look-up table.

22. The method of claim 1 wherein computing the expected SIR of the hypothesized traffic channel with the pre-filter adapted to the non-scheduled mobile terminal that would result if the non-scheduled mobile terminal was scheduled comprises:
  estimating the pre-filter of the hypothesized traffic channel; and
  computing the expected SIR based on the estimated pre-filter.

23. The method of claim 22 wherein computing the expected SIR of the hypothesized traffic channel with the pre-filter adapted to the non-scheduled mobile terminal that would result if the non-scheduled mobile terminal was scheduled further comprises estimating channel coefficients of the multi-path propagation channel between the base station and the mobile terminal.

24. The method of claim 23 wherein computing the expected SIR of the hypothesized traffic channel further comprises computing the expected SIR of the hypothesized traffic channel based on the estimated channel coefficients.

25. The method of claim 22 wherein computing the expected SIR of the hypothesized traffic channel further comprises estimating a noise level associated with the hypothesized traffic channel.

26. The method of claim 25 wherein computing the expected SIR of the hypothesized traffic channel based on the estimated noise level associated with the hypothesized traffic channel comprises computing the expected SIR ($SIR_{exp}$) according to:

$$SIR_{est} = \alpha_s \left(\frac{E_T}{\hat{I}_o}\right) h_n^H R_n^{-1} h_n,$$

where $\alpha_s$ represents the fraction of the total transmit power allocated to the pre-filtered traffic channel, $E_T$ represents the total transmit power, $\hat{I}_o$ represents the estimated noise level associated with the hypothesized traffic channel corresponding to the non-scheduled mobile terminal, $h_n$ represents a channel gain matrix corresponding to the non-scheduled mobile terminal, and $R_n$ represents an impairment covariance matrix corresponding to the non-scheduled mobile terminal.

27. The method of claim 25 wherein estimating a noise level associated with the hypothesized traffic channel comprises:
  estimating an interference level that would result if the non-scheduled mobile terminal was scheduled; and
  processing the interference level to estimate the noise level.

28. The method of claim 27 wherein estimating the interference level that would result if the non-scheduled mobile terminal was scheduled comprises:
  processing the received pilot signals to reconstruct the pilot signal; and subtracting the reconstructed pilot signal from the received pilot signals to estimate the interference level.

29. The method of claim 27 wherein processing the interference level to estimate the noise level comprises:
generating a set of K interference levels estimated over K frames of a received signal; and
selecting the minimum interference level within the set of interference levels as the estimated noise level.

30. The method of claim 1 wherein computing the expected SIR of the hypothesized traffic channel with the pre-filter adapted to the non-scheduled mobile terminal that would result if the non-scheduled mobile terminal was scheduled comprises computing the expected SIR of the hypothesized traffic channel at the non-scheduled mobile terminal.

31. The method of claim 1 wherein computing the expected SIR of the hypothesized traffic channel with the pre-filter adapted to the non-scheduled mobile terminal that would result if the non-scheduled mobile terminal was scheduled comprises computing the expected SIR of the hypothesized traffic channel at a base station in communication with the non-scheduled mobile terminal.

32. A method of scheduling one of a plurality of mobile terminals in a wireless communication system comprising:
computing an expected signal-to-interference ratio (SIR) of a hypothesized traffic channel with a pre-filter adapted to the non-scheduled mobile terminal that would result if the non-scheduled mobile terminal was scheduled; and
scheduling one of the plurality of mobile terminals based on the expected SIR of the hypothesized traffic channel.

33. The method of claim 32 further comprising:
selecting a preset noise level;
computing the expected SIR for each of the plurality of non-scheduled mobile terminals based on the preset noise level; and
comparing the expected SIRs to generate a set of relative SIR estimates.

34. The method of claim 33 wherein comparing the expected SIRs to generate a set of relative SIR estimates comprises comparing one of the expected SIRs to each of the remaining expected SIRs to generate the set of relative SIR estimates.

35. The method of claim 33 wherein scheduling one of the plurality of mobile terminals based on the expected SIR of the hypothesized traffic channel comprises scheduling one of the plurality of mobile terminals based on the set of relative SIR estimates.

36. The method of claim 32 wherein computing the expected SIR of the hypothesized traffic channel with the pre-filter adapted to the non-scheduled mobile terminal that would result if the non-scheduled mobile terminal was scheduled comprises computing the expected SIR of the hypothesized traffic channel so as to compensate for mismatch between the hypothesized traffic channel and a pilot channel, wherein said mismatch is due to the pre-filter that would result if the non-scheduled mobile terminal was scheduled.

37. The method of claim 36 wherein computing the expected SIR of the hypothesized traffic channel so as to compensate for mismatch between the hypothesized traffic channel and the pilot channel comprises:
measuring a pilot SIR of the pilot channel associated with the non-scheduled mobile terminal; and
generating a corrected SIR by applying a correction factor to the measured pilot SIR to compensate for the mismatch between the hypothesized traffic channel and the pilot channel associated with the non-scheduled mobile terminal.

38. The method of claim 37 wherein scheduling one of the plurality of mobile terminals based on the expected SIR of the hypothesized traffic channel comprises scheduling one of the plurality of mobile terminals based on the corrected SIR.

39. The method of claim 32 wherein computing the expected SIR of the hypothesized traffic channel with the pre-filter adapted to the non-scheduled mobile terminal that would result if the non-scheduled mobile terminal was scheduled comprises:
estimating the pre-filter of the hypothesized traffic channel; and
computing the expected SIR based on the estimated pre-filter.

40. A base station responsible for scheduling transmissions to one of a plurality of mobile terminals in a wireless network, the base station comprising:
a transmitter to transmit data to a plurality of mobile terminals over a time-multiplexed data channel; and
a scheduler to schedule transmissions to one of the plurality of mobile terminals based on expected signal-to-interference ratios (SIR)s, wherein the expected SIRs for non-scheduled mobile terminals are based on hypothesized traffic channels with pre-filters adapted to the non-scheduled mobile terminals that would result if the non-scheduled mobile terminals were scheduled.

41. The base station of claim 40 further comprising a receiver to receive one of the expected SIRs or a channel quality indicator from the non-scheduled mobile terminals.

42. The base station of claim 41 wherein the channel quality indicator represents a representation or mapping of the expected SIR.

43. The base station of claim 41 wherein the expected SIRs received at the receiver from the non-scheduled mobile terminals comprise expected SIRs computed at the non-scheduled mobile terminals based on a preset noise level.

44. The base station of claim 43 further comprising a comparator to compare one of the expected SIRs or the channel quality indicators based on the preset noise level received from the non-scheduled mobile terminals to generate a set of relative SIR estimates.

45. The base station of claim 40 wherein the scheduler schedules one of the plurality of mobile terminals based on the set of relative SIR estimates.

46. The base station of claim 40 further comprising a receiver to receive measured pilot SIRs from the non-scheduled mobile terminals.

47. The base station of claim 46 further comprising an SIR computer to apply correction factors to the measured pilot SIRs to generate the expected SIRs, wherein the correction factors compensate for mismatch between the hypothesized traffic channels and the pilot channels associated with the non-scheduled mobile terminals, and wherein the mismatch is due to pre-filters that would result if the non-scheduled mobile terminals were scheduled.

48. The receiver of claim 47 wherein the SIR computer comprises one of a multiplier and a summer to apply the correction factors to the measured SIRs.

49. The base station of claim 48 further comprising a memory to store a look-up table of correction factors, each of the stored correction factors corresponding to a different pilot SIR.

50. The base station of claim 49 wherein the SIR computer selects the correction factors corresponding to the measured pilot SIRs from the look-up table.

51. The base station of claim 47 further comprising a memory to store a look-up table of correction factors, each of the stored correction factors corresponding to a different signal delay spread.

52. The base station of claim 51 wherein the SIR computer selects the correction factors corresponding to a current signal delay spread from the look-up table.

53. The base station of claim 51 wherein each of the stored correction factors further correspond to different combinations of pilot SIRs and signal delay spreads, and wherein the SIR computer selects the correction factors corresponding to a current signal delay spread and the measured pilot SIR from the look-up table.

54. The base station of claim 53 wherein the transmitter further defines a current transmit power ratio corresponding to each of the plurality of mobile terminals.

55. The base station of claim 54 wherein each of the stored correction factors further correspond to different combinations of transmit power ratios, signal delay spreads, and pilot SIRs, and wherein the SIR computer selects the correction factors corresponding to current signal delay spreads, the measured pilot SIRs, and the current transmit power ratio from the look-up table.

56. The base station of claim 47 wherein the transmitter further defines a current transmit power ratio corresponding to each of the plurality of mobile terminals.

57. The base station of claim 56 further comprising a memory to store a look-up table of correction factors, each of the stored correction factors corresponding a different transmit power ratio.

58. The base station of claim 57 wherein the SIR computer selects the correction factor from the look-up table based on the current transmit power ratio.

59. The base station of claim 57 wherein each of the stored correction factors further correspond to different combinations of pilot SIRs and transmit power ratios, and wherein the SIR computer selects the correction factors corresponding to the measured pilot SIR and the current transmit power ratio from the look-up table.

60. A non-scheduled mobile terminal responsible for assisting a base station in scheduling one of a plurality of mobile terminals comprising:

a receiver to receive a pilot signal from the base station; and a signal-to-interference ratio (SIR) calculator to determine an expected SIR of a hypothesized traffic channel with a pre-filter adapted to the non-scheduled mobile terminal that would result if the non-scheduled mobile terminal was scheduled.

61. The non-scheduled mobile terminal of claim 60 wherein the SIR calculator computes the expected SIR based on a preset noise level.

62. The non-scheduled mobile terminal of claim 61 further comprising a measurement circuit to measure a pilot SIR.

63. The non-scheduled mobile terminal of claim 62 wherein the SIR calculator comprises a corrector to apply a correction factor to the measured pilot SIR to generate a corrected SIR, wherein the correction factor compensates for mismatch between the hypothesized traffic channel and a pilot channel associated with the non scheduled mobile terminal, and wherein said mismatch is due to the pre-filter associated with the hypothesized traffic channel of the non-scheduled mobile terminal.

64. The non-scheduled mobile terminal of claim 63 wherein the corrector comprises one of a multiplier and a summer.

65. The non-scheduled mobile terminal of claim 62 further comprising a transmitter to transmit one of the corrected SIR or a channel quality indicator to the base station.

66. The non-scheduled mobile terminal of claim 62 further comprising a memory to store a look-up table of correction factors, each of the stored correction factors corresponding to a different pilot SIR.

67. The non-scheduled mobile terminal of claim 66 wherein the SIR computer selects the correction factor corresponding to the measured pilot SIR from the look-up table.

68. The non-scheduled mobile terminal of claim 62 wherein the measurement circuit further measures a signal delay spread of the received pilot signal.

69. The non-scheduled mobile terminal of claim 68 further comprising a memory to store a look-up table of correction factors, each of the stored correction factors corresponding to a different signal delay spread.

70. The non-scheduled mobile terminal of claim 69 wherein the SIR computer selects the correction factor corresponding to the measured signal delay spread from the look-up table.

71. The non-scheduled mobile terminal of claim 69 wherein each of the stored correction factors further correspond to different combinations of pilot SIRs and signal delay spreads, and wherein the SIR computer selects the correction factor corresponding to the measured channel delay spread and the measured pilot SIR from the look-up table.

72. The non-scheduled mobile terminal of claim 71 wherein the receiver receives a current transmit power ratio from the base station.

73. The non-scheduled mobile terminal of claim 72 wherein each of the stored correction factors further correspond to different combinations of transmit power ratios, signal delay spreads, and pilot SIRs, and wherein the SIR computer selects the correction factor corresponding to the measured channel delay spread, the measured pilot SIR, and the current transmit power ratio from the look-up table.

74. The non-scheduled mobile terminal of claim 62 wherein the receiver receives a current transmit power ratio from the base station.

75. The non-scheduled mobile terminal of claim 74 further comprising a memory to store a look-up table of correction factors, each of the stored correction factors corresponding to a different transmit power ratio.

76. The non-scheduled mobile terminal of claim 75 wherein the SIR computer selects the correction factor corresponding to the current transmit power ratio from the look-up table.

77. The non-scheduled mobile terminal of claim 75 wherein each of the stored correction factors further correspond to different combinations of pilot SIRs and transmit power ratios, and wherein the SIR computer selects the correction factor corresponding to the measured pilot SIR and the current transmit power ratio from the look-up table.

78. The non-scheduled mobile terminal of claim 60 further comprising a noise level estimator to estimate the pre-filter of the hypothesized traffic channel that would result if the non-scheduled mobile terminal was scheduled, wherein the SIR computer computes the expected SIR based on the estimated pre-filter.

79. The non-scheduled mobile terminal of claim 78 wherein the noise level estimator further estimates a noise level associated with the hypothesized traffic channel and wherein the SIR computer computes the expected SIR based on the estimated noise level.

80. The non-scheduled mobile terminal of claim 79 wherein the SIR computer computes the expected SIR based on the estimated noise level associated with the hypothesized traffic channel according to:

$$SIR_{est} = \alpha_s \left( \frac{E_T}{\hat{I}_o} \right) h_n^H R_n^{-1} h_n,$$

where $\alpha_s$ represents the fraction of the total transmit power allocated to the pre-filtered traffic channel, $E_T$ represents the total transmit power, $\hat{I}_o$ represents the estimated noise level associated with the hypothesized traffic channel corresponding to the non-scheduled mobile terminal, $h_n$ represents a channel gain matrix corresponding to the non-scheduled mobile terminal, and $R_n$ represents an impairment covariance matrix corresponding to the non-scheduled mobile terminal.

81. The non-scheduled mobile terminal of claim 79 wherein the noise level estimator further estimates an interference level and wherein the noise level estimator processes the interference level to estimate the noise level.

82. The non-scheduled mobile terminal of claim 81 wherein the noise level estimator comprises:
   a reconstructor to reconstruct a pilot signal from the received pilot signal; and
   a combiner to subtract the reconstructed pilot signal from the received pilot signal to estimate the interference level.

83. The non-scheduled mobile terminal of claim 82 wherein the noise level estimator processes the interference level by generating a set of interference noise levels over K frames of the received pilot signal and selecting the minimum interference level within the set of interference levels as the estimated noise level.

84. A computer readable media for storing a set of instructions to estimate an expected signal-to-interference ratio (SIR) of an effective traffic channel for a non-scheduled mobile terminal, the set of instructions comprising:
   instructions to compute the expected SIR of a hypothesized traffic channel with a pre-filter adapted to the non-scheduled mobile terminal that would result if the non-scheduled mobile terminal was scheduled.

85. The computer readable media of claim 84 wherein the instructions to compute the expected SIR of the hypothesized traffic channel comprise instructions to compute the expected SIR of the hypothesized traffic channel so as to compensate for mismatch between the hypothesized traffic channel and a pilot channel associated with the non-scheduled mobile terminal, wherein said mismatch is due to the pre-filter that would result if the non-scheduled mobile terminal was scheduled.

86. The computer readable media of claim 85 wherein the instructions to compute the expected SIR of the hypothesized traffic channel so as to compensate for mismatch between the hypothesized traffic channel and the pilot channel associated with the non-scheduled mobile terminal comprise:
   instructions to measure a pilot SIR of the pilot channel associated with the non-scheduled mobile terminal; and
   instructions to apply a correction factor to the measured pilot SIR to compensate for the mismatch between the hypothesized traffic channel and the pilot channel associated with the non-scheduled mobile terminal.

87. The computer readable media of claim 84 wherein the instructions to compute the expected SIR of the hypothesized traffic channel comprise:
   instructions to estimate the pre-filter of the hypothesized traffic channel; and
   instructions to compute the expected SIR based on the estimated pre-filter.

88. The computer readable media of claim 87 wherein the instructions to estimate the pre-filter of the hypothesized traffic channel further comprise instructions to estimate a noise level associated with the hypothesized traffic channel.

89. The computer readable media of claim 88 wherein the instructions to compute the expected SIR of the hypothesized traffic channel that would result if the non-scheduled mobile terminal was scheduled comprise instructions to compute the expected SIR of the hypothesized traffic channel based on the estimated noise level.

90. The computer readable media of claim 87 where the instructions to estimate the pre-filter of the hypothesized traffic channel comprise instructions to preset a noise level based on expected channel conditions.

91. The computer readable media of claim 90 wherein the instructions to compute the expected SIR of the hypothesized traffic channel comprise instructions to compute the expected SIR based on the preset noise level.

92. A circuit to implement a process to estimate an expected signal-to-interference ratio (SIR) of an effective traffic channel for a non-scheduled mobile terminal, the circuit comprising:
   an SIR processor to compute the expected SIR of a hypothesized traffic channel with a pre-filter adapted to the non-scheduled mobile terminal that would result if the non-scheduled mobile terminal was scheduled.

93. The circuit of claim 92 wherein the SIR processor computes the expected SIR of the hypothesized traffic channel so as to compensate for mismatch between the hypothesized traffic channel and a pilot channel associated with the non-scheduled mobile terminal, wherein said mismatch is due to the pre-filter that would result if the non-scheduled mobile terminal was scheduled.

94. The circuit of claim 93 further comprising a measurement circuit to measure a pilot SIR of the pilot channel associated with the non-scheduled mobile terminal.

95. The circuit of claim 94 wherein the SIR processor applies a correction factor to the measured pilot SIR to compensate for the mismatch between the hypothesized traffic channel and the pilot channel of the non-scheduled mobile terminal.

96. The circuit of claim 92 wherein the SIR processor computes the expected SIR of the hypothesized traffic channel by estimating the pre-filter of the hypothesized traffic channel and computing the expected SIR of the hypothesized traffic channel based on the estimated pre-filter.

97. The circuit of claim 96 wherein the SIR processor estimates the pre-filter of the hypothesized effective traffic channel by estimating a noise level associated with the hypothesized traffic channel.

98. The circuit of claim 97 wherein the SIR processor computes the expected SIR of the hypothesized traffic channel based on the estimated noise level.

99. The circuit of claim 96 further comprising a memory circuit to store a preset noise level, wherein the SIR processor computes the expected SIR of the hypothesized traffic channel based on the preset noise level.

* * * * *

UNITED STATES PATENT AND TRADEMARK OFFICE
CERTIFICATE OF CORRECTION

PATENT NO. : 7,599,702 B2  Page 1 of 1
APPLICATION NO. : 10/745051
DATED : October 6, 2009
INVENTOR(S) : Molnar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1684 days.

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,599,702 B2
APPLICATION NO. : 10/745051
DATED : October 6, 2009
INVENTOR(S) : Molnar et al.

It is certified that error appears in the above-identified patent and that said Letters Patent is hereby corrected as shown below:

On Title page 2, in item (56), under "OTHER PUBLICATIONS", in Column 2, Line 3, delete "Kransy," and insert -- Krasny, --, therefor.

In Column 6, Lines 59-60, in Equation (9), delete "$x(jT+\tau_{q1}-\tau_{nmp1}-uT_c)x^*(jT+\tau_{q2}-\tau_{nmp2}-uT_c)[1-\delta(u)\delta(j)],$".

In Column 7, Line 55, delete "$g_{mn}$" and insert -- $g_{nm}$ --, therefor.

In Column 13, Line 64, delete "SIRa" and insert -- SIRs --, therefor.

In Column 18, Line 52, in Claim 48, delete "receiver" and insert -- base station --, therefor.

Signed and Sealed this
Twenty-sixth Day of June, 2012

David J. Kappos
*Director of the United States Patent and Trademark Office*